United States Patent [19]

Mork

[11] Patent Number: 5,024,280
[45] Date of Patent: Jun. 18, 1991

[54] SOIL LEVELING APPARATUS WITH IMPROVED FRAME AND HITCH

[76] Inventor: Orlan H. Mork, 6029 225th St. West, Farmington, Minn. 55024

[21] Appl. No.: 372,027

[22] Filed: Jun. 27, 1989

Related U.S. Application Data

[63] Continuation of Ser. No. 163,178, Feb. 26, 1988, abandoned, which is a continuation of Ser. No. 856,818, Apr. 28, 1986, abandoned, which is a continuation-in-part of Ser. No. 570,347, Jan. 13, 1984, Pat. No. 4,585,075, which is a continuation-in-part of Ser. No. 224,458, Jan. 12, 1981, Pat. No. 4,448,258.

[51] Int. Cl.$^5$ .................. E02F 3/815; A01B 49/02
[52] U.S. Cl. ................. 172/197; 172/445.1; 172/439; 172/501; 172/149; 280/497
[58] Field of Search .............. 172/197, 198, 445.1, 172/445.2, 684.5, 701.1, 701.3, 464, 196, 199, 200, 393, 780, 784, 785, 799.5, 449, 439, 248, 173, 177, 150, 501, 149; 280/461 A, 497; 37/41, 48, 50; 404/106, 118, 119, 120

[56] References Cited

U.S. PATENT DOCUMENTS

| | | |
|---|---|---|
| 425,793 | 4/1890 | Holland . |
| 563,760 | 7/1896 | Folsom ................. 172/199 |
| 939,664 | 11/1909 | Casner . |
| 1,176,591 | 3/1916 | Monroe . |
| 1,200,113 | 10/1916 | Hunter . |
| 1,247,416 | 11/1917 | Leak . |
| 1,267,623 | 5/1918 | Bowen . |
| 1,337,355 | 4/1920 | Ghent ................. 172/150 |
| 1,585,044 | 5/1926 | Patton ................. 172/197 |
| 1,727,181 | 9/1929 | Skinner ............... 172/684.5 |
| 1,755,631 | 4/1930 | Burnett ............... 172/684.5 |
| 1,833,878 | 11/1931 | Adams ................. 404/118 |
| 2,189,962 | 2/1940 | Rae ................... 172/150 |
| 2,302,702 | 11/1942 | Leschinsky ........... 172/197 |
| 2,346,757 | 4/1944 | Horner ............... 172/449 |
| 2,405,980 | 8/1946 | Sands et al. . |
| 2,574,385 | 11/1951 | Gilreath ............. 172/177 |
| 2,578,131 | 12/1951 | Gannon .............. 172/136 |
| 2,657,619 | 11/1953 | Gilreath . |
| 2,762,140 | 9/1956 | Elfes ................. 172/445.2 |
| 2,795,060 | 6/1957 | Geiszler . |
| 2,817,203 | 12/1957 | Sievers et al. ....... 172/684.5 |
| 2,865,117 | 12/1958 | Davis et al. ......... 172/197 |
| 2,868,306 | 1/1959 | Key ................... 172/200 |
| 2,920,405 | 1/1960 | Cole ................. 172/198 X |
| 2,983,060 | 5/1961 | Rosselot . |
| 2,994,142 | 8/1961 | Newell et al. ........ 172/445.1 |
| 3,122,209 | 2/1964 | Crites ............... 172/197 |
| 3,193,306 | 7/1965 | Pettit ............... 172/449 |
| 3,213,554 | 10/1965 | Dalton .............. 172/197 |
| 3,274,712 | 9/1966 | Jones ................ 172/197 |
| 3,274,713 | 9/1966 | Jones ................ 172/197 |
| 3,276,153 | 10/1966 | Sorenson ............ 172/387 |
| 3,324,955 | 6/1967 | Perold .............. 172/684.5 |
| 3,336,685 | 8/1967 | Keller .............. 172/445.1 |
| 3,430,703 | 3/1969 | Richey .............. 172/197 |
| 3,556,228 | 1/1971 | Mork ................ 172/445.1 |
| 3,692,120 | 9/1972 | Cline ............... 172/151 |
| 3,705,630 | 12/1972 | Vissers ............. 172/713 |
| 3,724,557 | 4/1973 | Boschung et al. .... 172/785 |
| 3,834,465 | 9/1974 | Collins . |

List continue on next page.

Primary Examiner—Richard J. Johnson
Attorney, Agent, or Firm—James W. Miller

[57] ABSTRACT

An improved soil leveling apparatus (10) includes a frame (12), connecting hitch means (14), and adjustable lost motion linkage (48) secured to the top connection point (52) of the hitch, and an optional scarifier assembly (16) which is supported on a connector (66) pivoted between the legs (36, 40) of the hitch. The scraper member (18) of the frame (12) is of generally inverted J-shaped cross section, and tine subassemblies (90) can be substituted for the teeth (78) on the scarifier assembly (12).

55 Claims, 10 Drawing Sheets

FOREIGN PATENT DOCUMENTS

| | | | |
|---|---|---|---|
| 1074994 | 4/1980 | Canada ............... 172/197 |
| 430341 | 6/1926 | Fed. Rep. of Germany . |
| 1314296 | 11/1962 | France . |
| 117395 | 8/1969 | Norway . |
| 813809 | 5/1959 | United Kingdom ..... 172/445.1 |
| 849677 | 9/1960 | United Kingdom ..... 172/445.1 |

U.S. PATENT DOCUMENTS

| | | | |
|---|---|---|---|
| 3,904,380 | 9/1975 | Smith | 52/732 |
| 3,905,425 | 9/1975 | Jackson . | |
| 4,155,315 | 5/1979 | Dobbins | 172/200 |
| 4,196,778 | 4/1980 | Smith | 172/445.1 |
| 4,217,962 | 8/1980 | Schaefer | 172/197 |
| 4,239,251 | 12/1980 | Rocksvold | 172/449 |
| 4,252,198 | 2/1981 | Formhals | 172/501 |
| 4,320,988 | 3/1982 | Seal | 172/393 |
| 4,374,546 | 2/1983 | Mitchel | 172/150 |
| 4,386,662 | 6/1983 | Kalif | 172/445.1 |
| 4,418,759 | 12/1983 | Mork | 172/197 |
| 4,436,040 | 3/1984 | Chumley | 172/197 |
| 4,448,258 | 5/1984 | Mork | 172/197 |
| 4,535,847 | 8/1985 | Hasegawa | 172/445.1 |
| 4,585,075 | 4/1986 | Mork | 172/197 |
| 4,655,297 | 4/1987 | Bourgeois | 172/445.1 |
| 4,815,542 | 3/1989 | DePlazes | 172/253 |
| 4,836,295 | 6/1989 | Estes | 172/197 |
| 4,850,433 | 7/1989 | West | 172/684.5 |

OTHER PUBLICATIONS

Ford brochure "Front and Rear Mounted Blades", bearing 1958 copyright notice to Ford Motor Company.

Ford Rotary Cutters brochure, penultimate page.

Product brochure for the Jacobsen Trap King II (undated).

Brillion "AG Model Sure-Stand Grass Seeder" brochure (undated).

Turfshaper: The Missing Link Between the Bulldozer and Mower, bearing 1977 copyright notice to Lily Corp.

Product brochure for the New Super Gill '100' (undated).

Product brochure for the New Super Gill '200' (undated).

Product brochure for the Viking Roller Blade (undated).

"Break New Ground with a Rock Hound B Series" brochure (undated).

Product brochure for Track Type Tractors, from Caterpillar Tractor Co. (undated).

700 Series Bobcat loader product brochure from Clark Equipment Co. (undated).

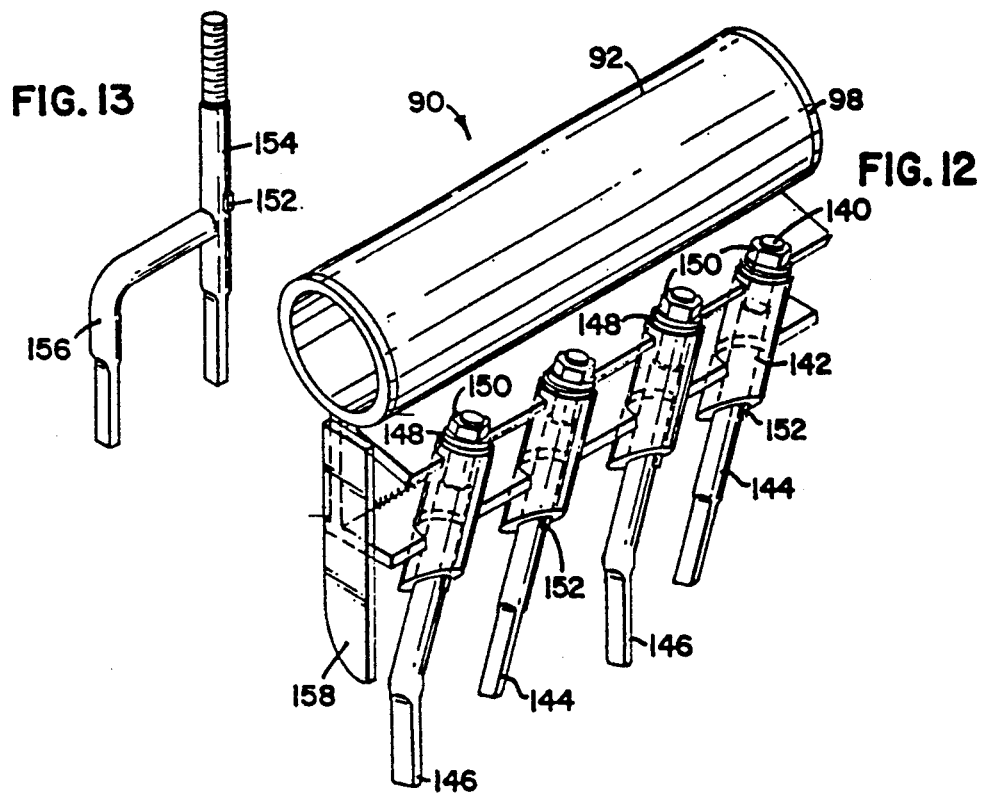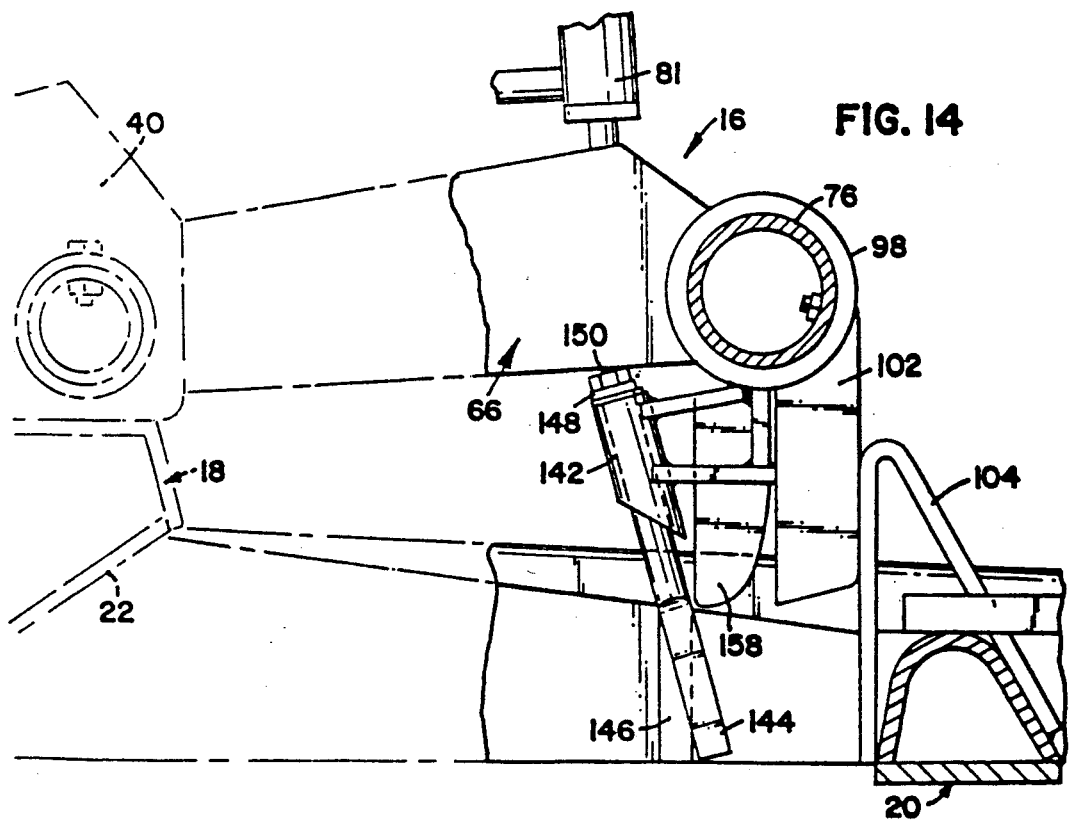

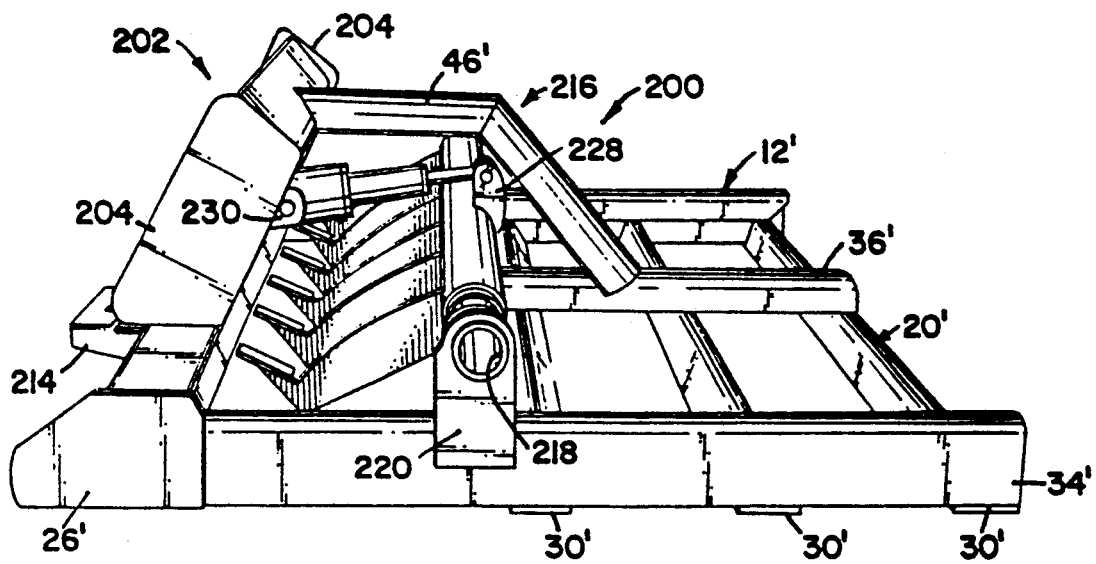
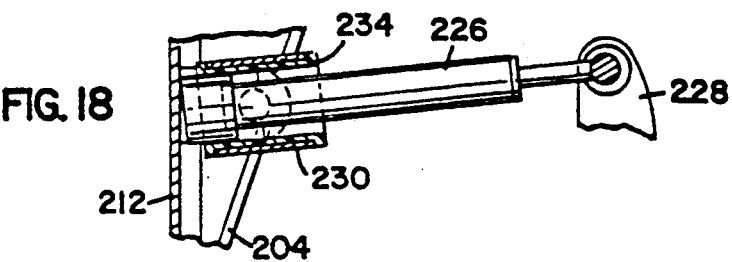
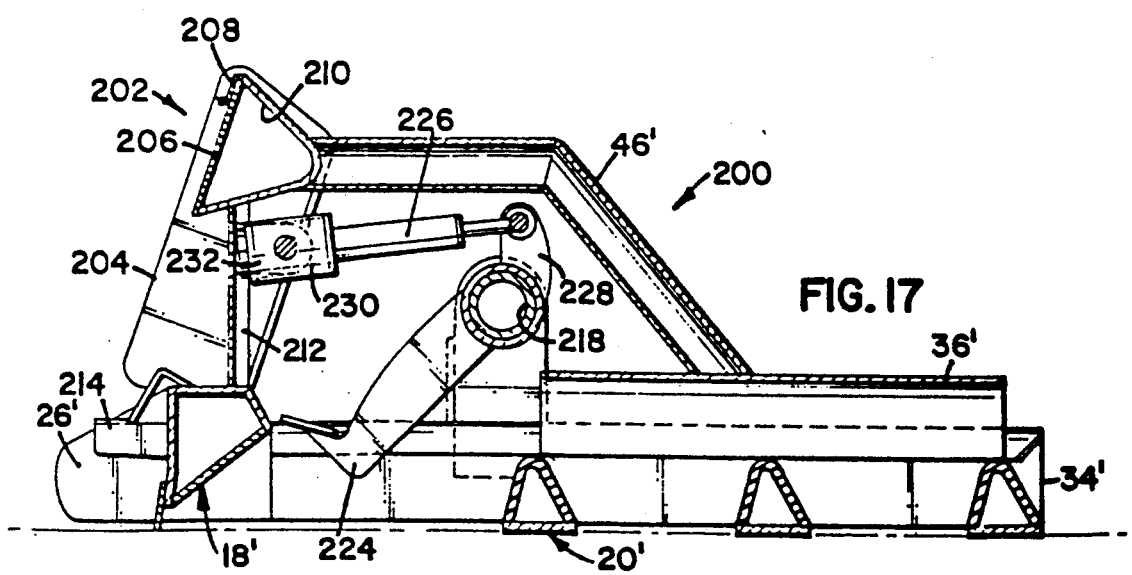

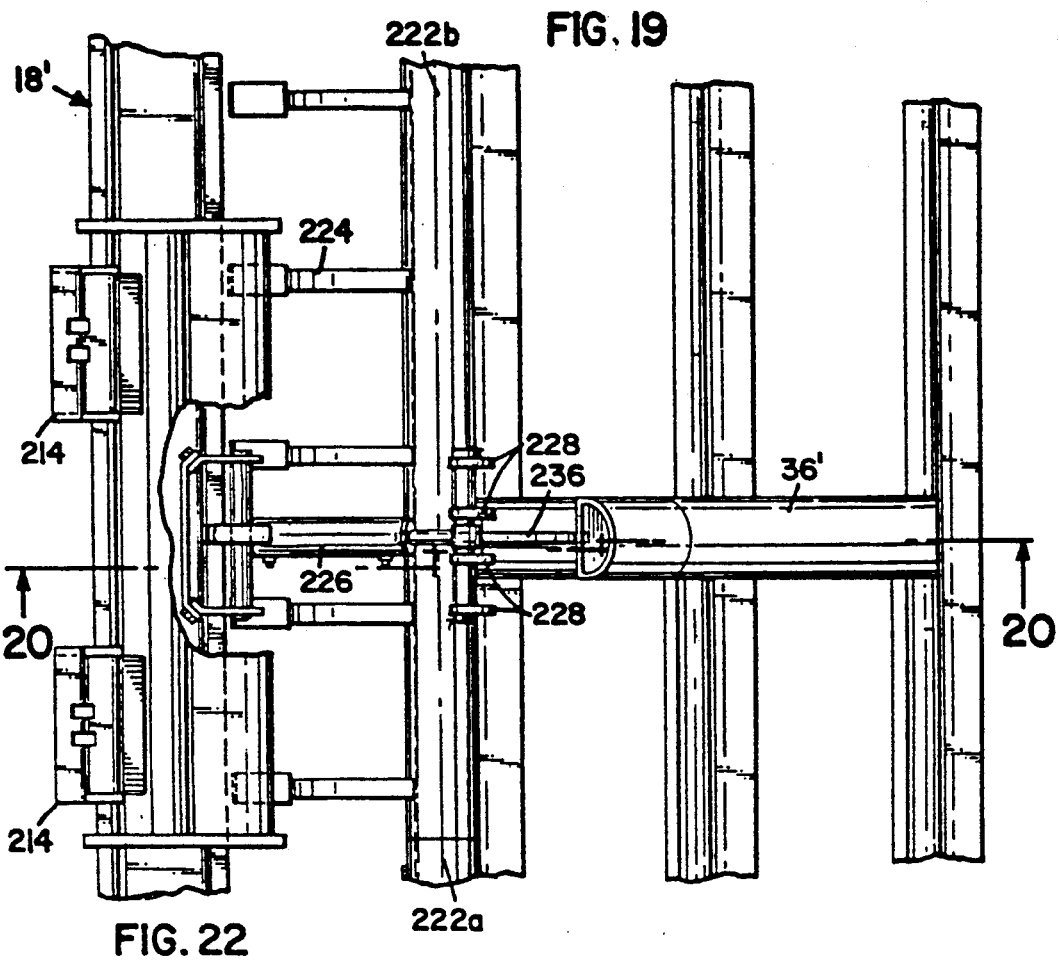
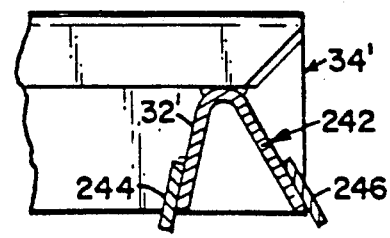
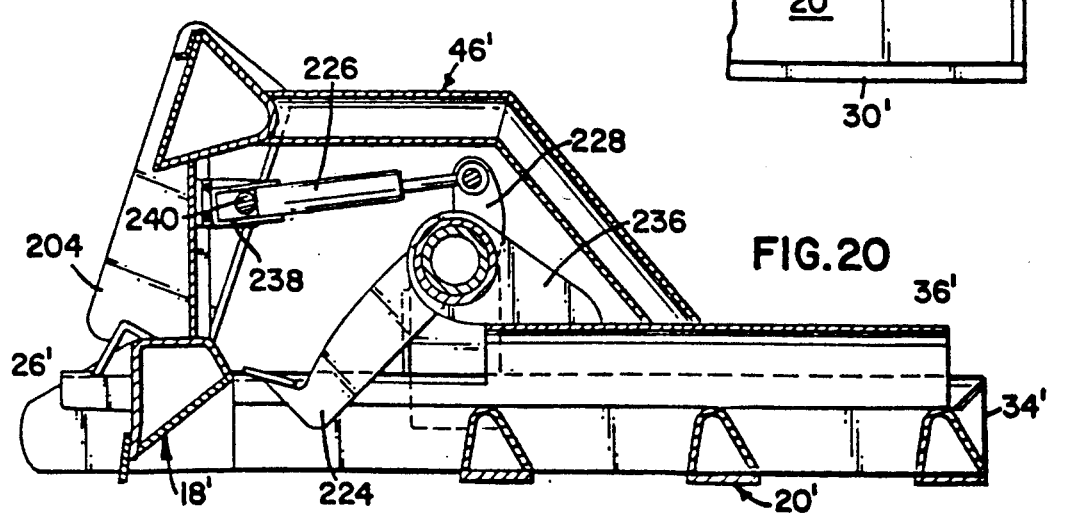

SOIL LEVELING APPARATUS WITH IMPROVED FRAME AND HITCH

CROSS REFERENCE TO RELATED APPLICATION

This application is a continuation of application Ser. No. 163,178, abandoned, which was filed on Feb. 26, 1988 and is a continuation of application Ser. No. 856,818, now abandoned, which was filed on Apr. 28, 1986. Application Ser. No. 856,818 is in turn a continuation-in-part of application Ser. No. 570,347, now U.S. N0. 4,585,075, filed Jan. 13, 1984, which was a continuation-in-part of application Ser. No. 224, 458, now U.S. Pat. No. 4,448,258, filed Jan. 12, 1981. Applicant hereby claims priority under the provisions of 35 U.S.C 120 for all commonly disclosed subject matter in each of the above-referenced patent applications. The disclosures of all of the above-mentioned patents are further hereby incorporated by reference herein.

TECHNICAL FIELD

The present invention relates generally to a device for attachment to a vehicle for cutting, leveling and otherwise grading the soil or the like. More particularly, this invention concerns a soil leveling apparatus incorporating an improved frame, an improved hitch, an improved scarifier assembly, an optional pulverizer attachment, and other features which provide more versatility and controlability in order to achieve better performance.

BACKGROUND ART

Proper site preparation requires that the ground be graded as necessary for compatibility with planting, sodding, paving or whatever the next and usually final construction or maintenance step may be. Such site preparation typically involves first breaking up and loosening the soil as necessary followed by leveling the soil to the desired grade. This may entail the use of different tools, depending upon the soil conditions, and multiple passes over the site which is both time consuming and expensive.

In the past weighted boards and the like were dragged behind tractors to smooth and level the surface of the soil. This technique was relatively crude and unsatisfactory because it did not allow for controlling the angle or grade of the soil surface, and loose dirt tended to collect in front of the board which would escape around the outer edges leaving ridges which then had to be smoothed manually with rakes or the like.

My prior U.S. Pat. No. 3,556,228 shows an apparatus for leveling soil and the like which was adapted to overcome the difficulties associated with the prior art at that time. This device generally consisted of a frame adapted for connection to a three-point hitch on a draft vehicle such as a tractor. The frame consisted of a number of transverse ground engaging members arranged in longitudinally spaced apart relationship. The leading member therein was a member of generally inverted U-shaped cross section to effect cutting, while the other trailing members were of closed, generally rectangular cross section for leveling purposes. The transverse ground engaging members were interconnected by longitudinal braces in a ladder-like fashion to form a rigid frame. Individual retaining shoes or plates were provided on opposite ends of each ground engaging member to retain loose soil to avoid formation of soil ridges.

This device operated well and was a significant improvement over the prior art at that time, although experience later showed that improvements could be made. The parent hereof, referenced above, discloses such an improved soil leveling apparatus. It has been found, however, that even this device can be improved upon. For example, under some soil conditions it has been found that the effectiveness of a leading ground engaging member of generally inverted U-shaped cross section can be severely restricted if it should become plugged with soil. In addition, three-point hitches of various types and ages exhibit various degrees of looseness which may not be compatible with different soil conditions. Some degree of play or looseness at the top link of the three-point hitch is generally desirable because it enables the apparatus to float somewhat on the soil surface without undue gouging, however, too much looseness is undesirable.

Further, some conditions may call for soil working relatively less aggressive, but which is desired as a substitute for or in addition to, that type of soil working provided by the scarifier assembly.

There is, thus, a need for an improved soil leveling apparatus of even greater versatility.

SUMMARY OF THE INVENTON

The present invention comprises an improved soil leveling apparatus which overcomes the foregoing and other difficulties associated with the prior art. In accordance with the invention, there is provided a soil leveling apparatus having an improved frame, connection means for the hitch, and other features and options which enhance its capability and versatility.

The frame comprises a plurality of transverse ground engaging members, the leading member being a scraper member of generally inverted J-shaped cross section in order to avoid soil plugging. The frame includes a pair of laterally spaced apart side frame members which are of uneven channel-like configuration secured to opposite ends of the trailing ground engaging member so as to reduce construction costs while providing the necessary structural rigidity.

The trailing ground engaging members are of generally inverted rounded V-shaped cross section in order to provide a substantially upright surface for pushing the soil in a forward direction, with an inclined surface for lifting the soil in a rearward direction.

The connection means on the frame for securing the apparatus to a three-point hitch is of generally A-shaped configuration, which is also adapted to serve as the support for the ajustable scarifier assembly. This also simplifies construction of the soil leveling apparatus and enhances the structural integrity thereof. An adjustable lost motion linkage is preferably provided at the top end of the connection means for receiving the top link of a three-point hitch in order to provide the degree of play desirable under the particular conditions.

BRIEF DESCRIPTION OF DRAWINGS

A better understanding of the invention can be had by reference to the following Detailed Description in conjuction with the accompanying Drawings, wherein:

FIG. 6 is a vertical sectional view taken along lines 6—6 of FIG. 5 in the direction of the arrows;

FIG. 12 is an enlarged perspective detailed view of a modified tine assembly;

FIG. 13 is an enlarged perspective view of an offset tine that can be used in the tine assembly of FIG. 12;

FIG. 14 is a sectional detailed view showing the tine assembly of FIG. 12 mounted on the cross shaft of the scarifier assembly of the first embodiment;

FIG. 15 is a perspective view of an improved soil leveling apparatus incorporating a second embodiment of the invention;

FIG. 17 is a vertical sectional view taken along lines 17—17 of FIG. 16 in the direction of the arrows;

FIG. 18 is a partial cross sectional diagram showing the relationship between the cylinder and collar of the actuator used in the scarifier assembly;

FIG. 19 is a partial top view of a modified scarifier assembly;

FIG. 20. is a vertical cross sectional view taken along lines 20—20 of FIG. 19 in the direction of the arrows;

FIG. 21 is a partial end view of the soil leveling apparatus showing the configuration of the side members; and FIG. 22 is a diagram showing an alternate construction of the trailing ground engaging members.

DETAILED DESCRIPTION

The entire disclosure of U.S. Pat. No. 4,448,258 is incorporated herein by reference.

Figure 1:
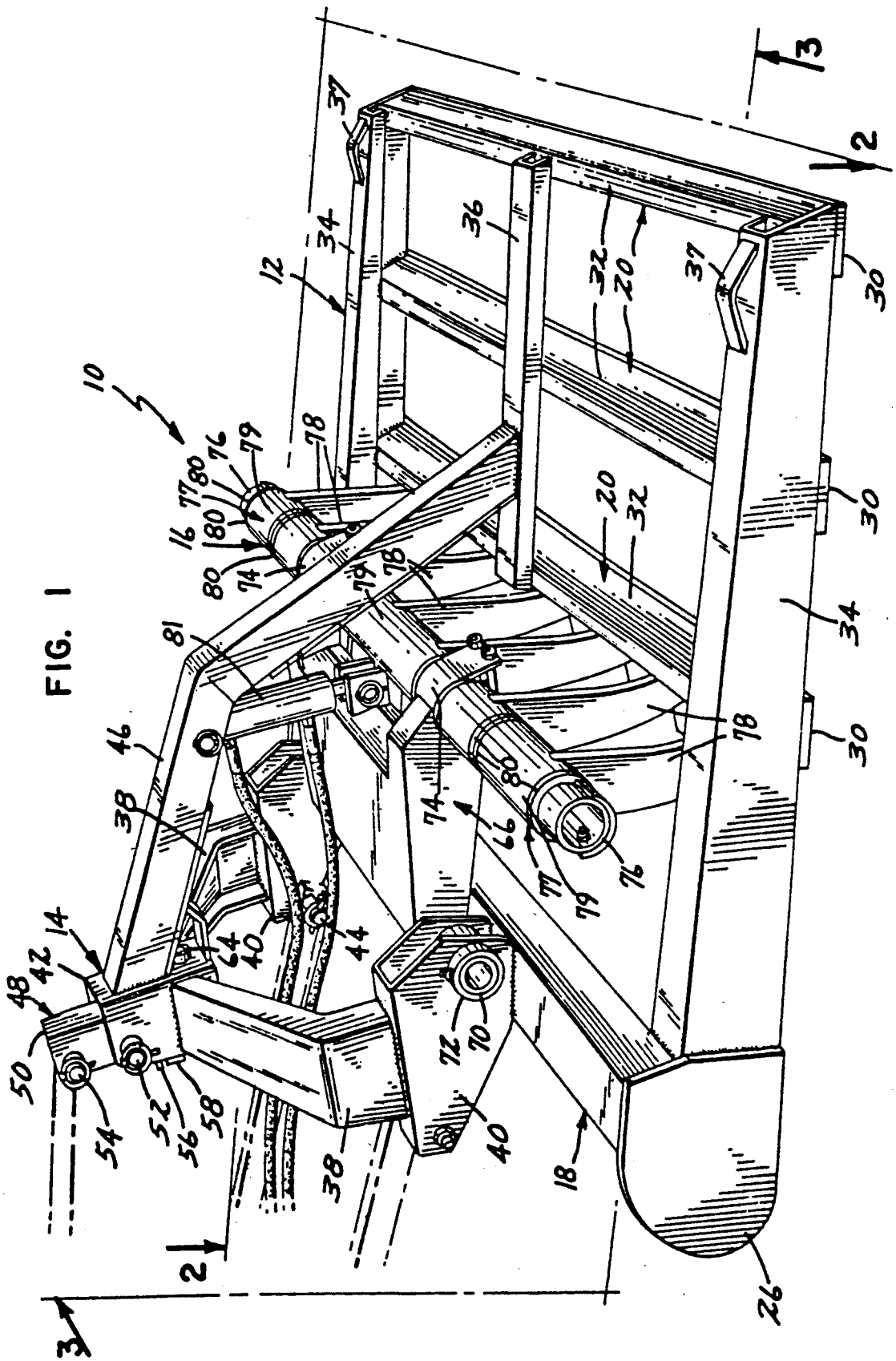
FIG. 1 is a perspective view of an improved soil leveling apparatus incorporating a first embodiment of the invention.

Referring now to the Drawings herein, in which like reference numerals designate like or corresponding elements throughout the views, and particularly referring to FIG. 1, there is shown a soil leveling apparatus 10 of the invention. The apparatus 10 comprises a frame 12, a hitch or connection means 14 mounted on the frame for attachment of the apparatus to a suitable draft means, and a scarifier assembly 16.

As illustrated, the connection means 14 is adapted for use with a three-point hitch, however, it will be appreciated that frame 12 of the apparatus 10 can be provided with a connection means like that shown in the parent application for use with a skidsteer vehicle or any other suitable connecting hitch means depending upon the type of draft vehicle with which the apparatus is to be used.

Figure 2:
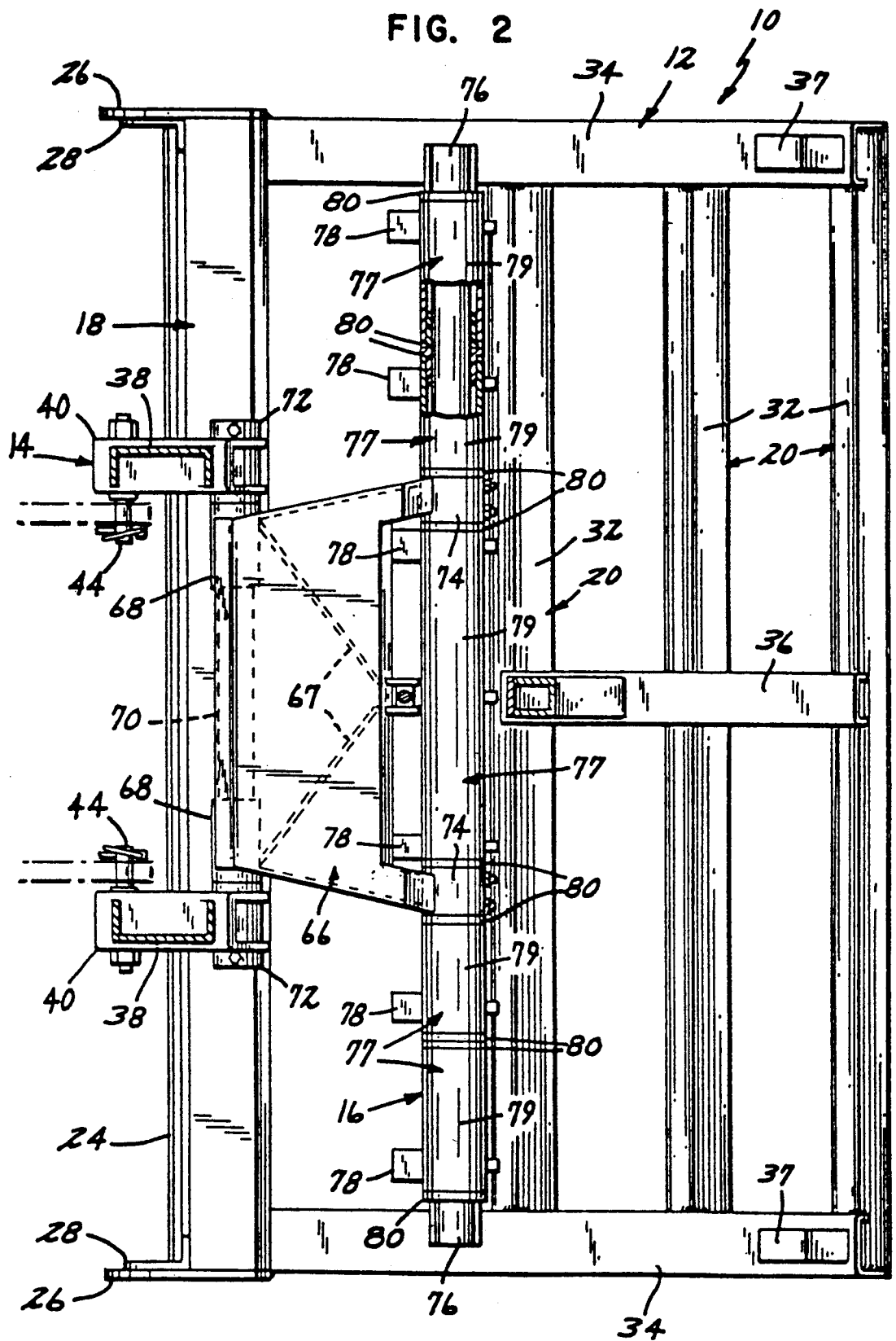
FIG. 2 is a horizontal sectional view taken along lines 2—2 of FIG. 1 in the direction of the arrow.
Figure 3:
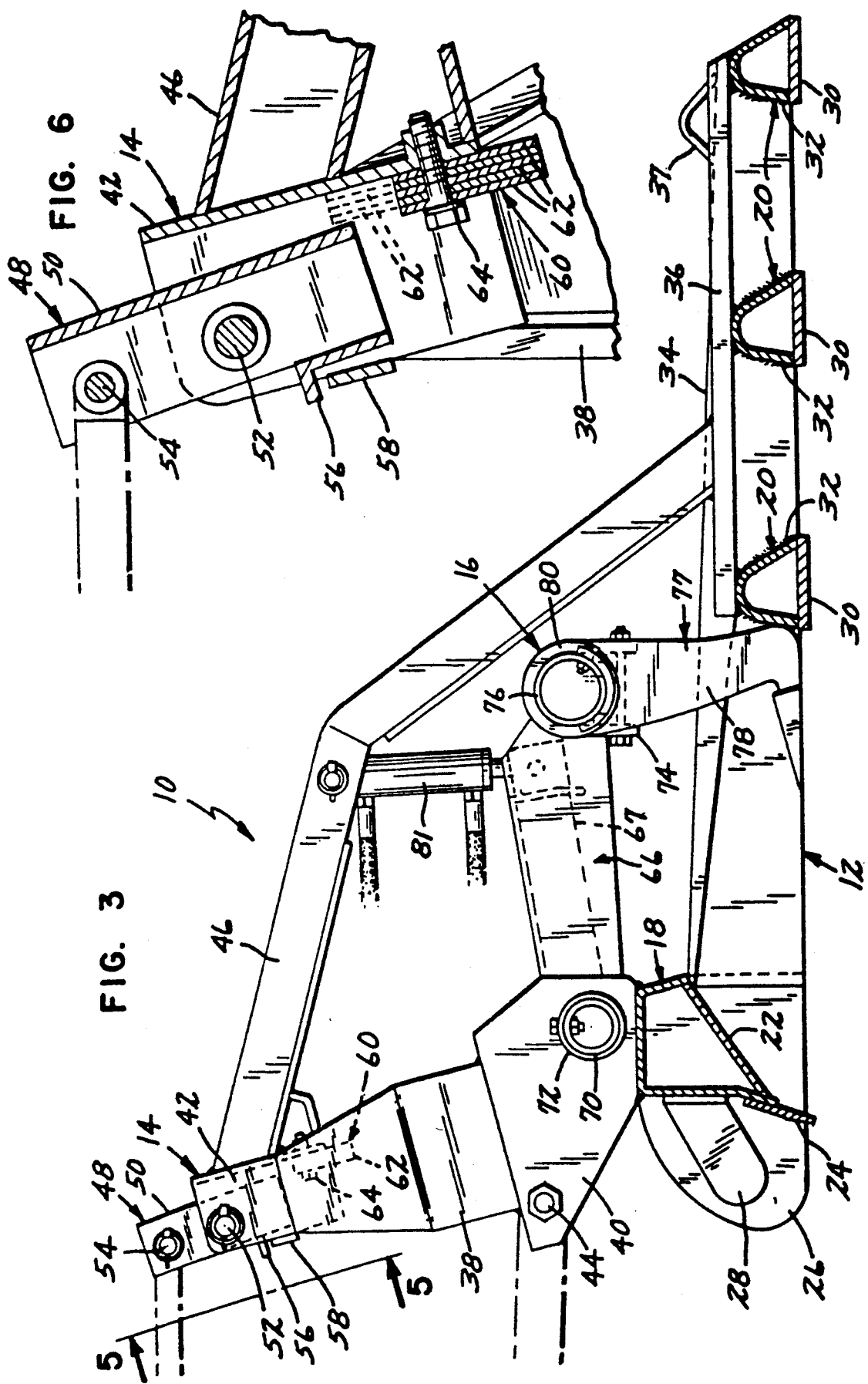
FIG. 3 is a vertical sectional view taken along lines 3—3 of FIG. 1 in the direction of the arrows.

Referring now to FIG. 1 in conjunction with FIGS. 2 and 3, the frame 12 of the soil leveling apparatus 10 comprises a leading ground engaging member 18 and a plurality of trailing ground engaging members 20. All of the ground engaging members 18 and 20 are oriented transverse to the direction of travel of the apparatus 10. The forward ground engaging member 18, as is best seen in FIG. 3, is of generally inverted J-shaped cross section and includes braces 22 secured between the divergent front and back walls of the ground engaging member. A blade 24 is secured to the front, relatively longer wall of the ground engaging member 18 for better cutting action and wear resistance. The blade 24 can be welded, bolted or otherwise suitably secured to the forward ground engaging member 18. It will thus be apparent that the rear wall of the forward ground engaging member 18 is relatively shorter than the front wall. This is advantageous because it provides rigidity without allowing soil to plug the interior of the member, which can occur under certain conditions when an inverted channel section is utilized for the forward ground engaging member. The forward ground engaging member 18 thus functions as a scraper member.

The forward ground engaging member 18 is secured between a pair of side plates 26 which serve as soil retainers to prevent the soil from flowing outwardly around the apparatus and thus forming ridges. If desired, braces 28 can be secured between the soil retaining plates 28 and the forward ground engaging member 18 for reinforcement.

A plurality of trailing ground engaging members 20 are located behind the forward ground engaging member 18 for purposes of leveling the soil. Three trailing ground engaging members 20 are shown, however, any suitable number can be utilized. Each trailing ground engaging member 20 includes a wear plate 30 secured to and enclosing the open end of a hollow member 32. The hollow member 32 is preferably of generally inverted rounded V-shaped cross section with the forward wall thereof being substantially upright in order to push the soil in a forward direction, and the rear wall being inclined to allow the soil to pass over the ground engaging member in the reverse direction.

The trailing ground engaging members 20 are secured between a pair of longitudinal side members 34. Each side member 34 is of general channel-shaped cross section along the portion thereof extending between the trailing ground engaging members 20 with the upper surfaces of the side members sloping downwardly away from the forward ground engaging member 18. The ends of the trailing ground engaging members 20 are thus butted against the outer legs of the side members 34 and are welded at their ends both to the outer leg and to the lower edge of the inner legs of the side members. A longitudinal member 36 is preferably secured across the tops of the trailing ground engaging members 20 for additional rigidity. If desired, lugs 37 can be attached to the side members 34 for connection of a drag or the like to the apparatus 10.

The connection means 14 is of generally A-shaped configuration including a pair of legs 38 which are secured at their lower ends to a pair of laterally spaced apart feet or supports 40 secured to the forward ground engaging member 18. The legs 38, which are inclined forwardly as shown, extend upwardly to a member 42. The connection means 14, as illustrated is adapted for use with a three-point hitch, the top and bottom links of which are indicated by phantom lines. The base supports 40 include pivotal connection points 44 for attachment to the bottom links of a three-point hitch, while the top member 42 is adapted for attachment to the top link of the three-point hitch. A longituidinal brace 46 is preferably connectd between the top member 42 of the connection means 14 and the longitudinal member 46 of the frame 12.

Figure 5:
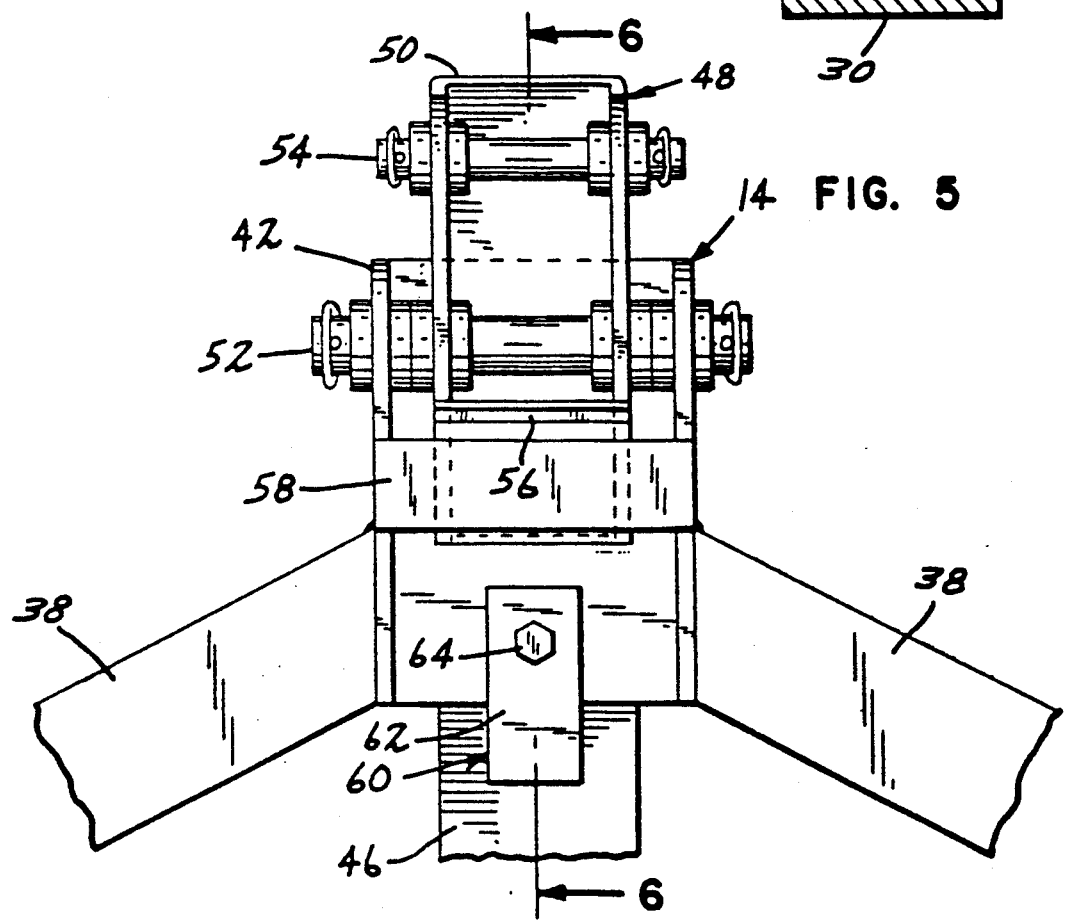
FIG. 5 is a view taken along lines 5—5 of FIG. 3 showing the front side of the adjustable lost motion linkage mounted at the top of the connection means.

Referring to FIG. 3 in conjuction with FIGS. 5 and 6, the soil leveling apparatus 10 preferably includes a lost motion linkage 48 in the top member 42 of the connecting means 14. The purpose of the lost motion linkage 48 is to provide an adjustable amount of controlled play between the top link of the three-point hitch on the draft vehicle (not shown) and the connection means 14 so that some pivotal floating action of the soil leveling apparatus can occur. The lost motion linkage 14 includes a plate 50, which is illustrated as being a section of channel stock, supported for pivotal movement on a pin 52 extending across the top member 42. Another pivotal connection 54 is provided at the upper end of the plate 50 for attachment to the top link of the three-point hitch on the draft vehicle. A first stop 56 is secured to the lower end of the plate 50 for cooperation with a cross piece 58 extending across the lower end of the top member 42. The lost motion linkage 48 thus includes a fixed stop which limits rearward pivotal motion of the plate 50. An adjustable stop 60 is also provided for limiting forward pivoting of the plate 50. As illustrated, the adjustable stop 60 comprises a number of shims 62 with offset holes therein through which a bolt 64 extends to secure the shims to the inside of the top member 42. It will thus be appreciated that the amount of pivotal motion of the plate 50 can be controlled by loosening the bolt 64 and turning a suitable number of shims upwardly between the lower end of the plate 50 and the back of the top member 42, as shown in FIG. 1, and then tightening the shims in place with the bolt 64 so as to limit the range of fore/aft pivotal movement of the linkage 48. This comprises a significant feature of the present invention. By means of the adjustable lost motion linkage 48, suitable play can be provided between the top link of a three-point hitch and the connection means 14 of the soil leveling apparatus 10.

Referring again to FIGS. 1 through 3, the soil leveling apparatus 10 preferably includes a scarifier assembly 16 which is mounted for adjustable, vertical positioning relative to the frame 12. The scarifier assembly 16 includes a single connector 66 having a pair of sleeves 68 secured at the forward end for receiving a cross shaft 70 extending between the base members 40 of the connection means 14. The cross shaft 70 extends through the sleeves 68 of the connectors 66 and through bushed holes in the base members 40, and is retained in place be means of collars 72.

The connector 66, which is preferably formed from a piece of plate bent as shown for rigidity, also includes a pair of clamps 74 at the side opposite that of the sleeves 68. Clamps 74 function to secure the pivotal connector 66 to a second, relatively longer cross shaft 76 on which the teeth subassemblies 77 are suspended in side-by-side relationship between end caps 75. Each subassembly 77 includes a depending tooth 78 secured at its upper end to a sleeve 79 pivotally supported on the second cross shaft 76. The scarifier teeth 78 can be individually pivoted to the cross shaft 76, or pivotally supported in groups. Bushings 80 are provided in the ends of each sleeve 79. A double acting cylinder 81 is connected between the top brace 46 and a pair of lugs on the connector 66 for controlling the position of the scarifier assembly 16 and thus the extent of penatration into the soil by the teeth 78.

If desired, a pair of diagonal braces 67, as is best seen in FIG. 2 can be provided on the underside of the connector 66 for reinforcement.

Figure 4:
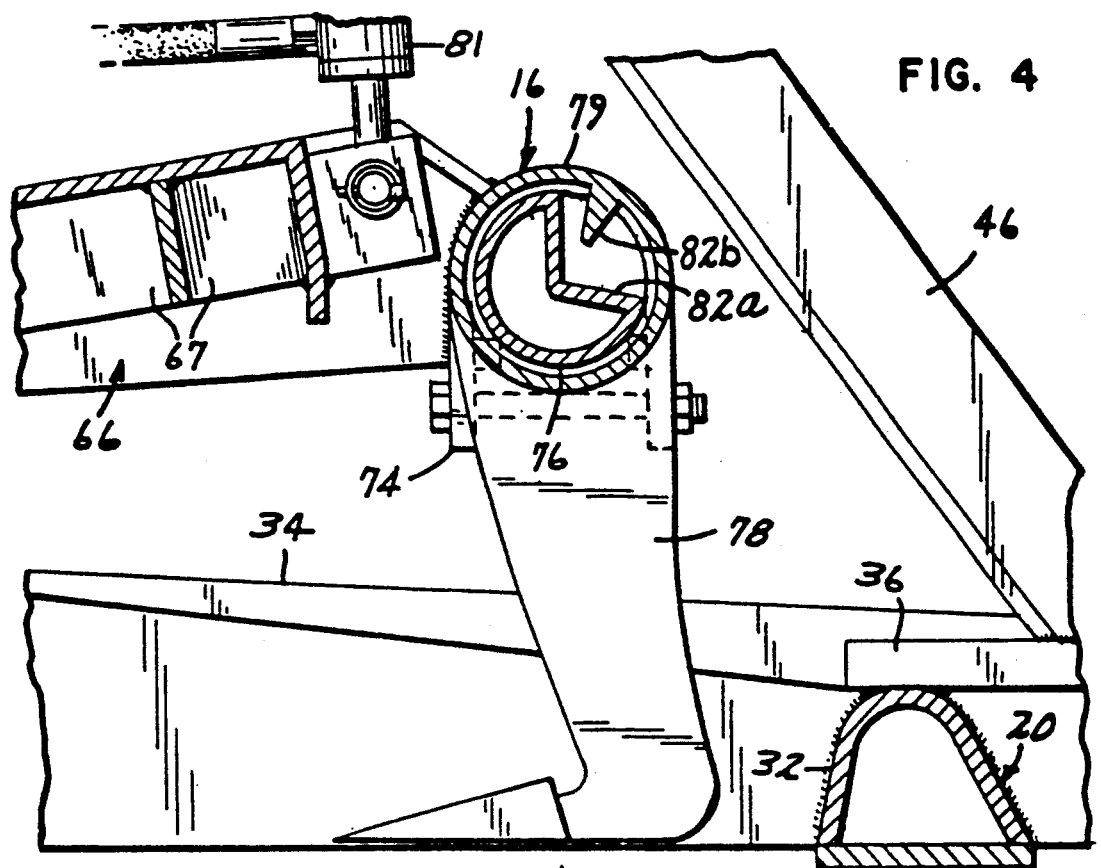
FIG. 4 is an enlarged detailed view of a modification of the scarifier stop assembly.

Referring momentarily to FIG. 4, there is shown a modification of the scarifier assembly 16. The scarifier assembly 16 as shown in FIGS. 1 through 3 includes a number of pivotal scarifier teeth 78 whose rearward pivotal motion is limited by the adjacent trailing ground engaging member 20. The longitudinal spacing between the forward ground engaging member 18 and the next adjacent ground engaging member 20 is preferably sufficient to allow the scarifier teeth 78 to pivot forwardly out of ground engagement when the apparatus 10 is reversed. In some situations, however, it may be desirabe to limit pivotal movement of the scarifier teeth 78 by means other than the next adjacent trailing ground engaging member 20. For example, the second cross shaft 76 can be notched as shown in FIG. 4 for cooperation with an inwardly projecting stop 82 provided on the sleeve supporting the tooth. The particular orientation of the notch in the cross shaft 76 and the stop 82 is not critical to the invention, however, in some situations it may be desirable to rotate their position about 150 degrees clockwise from that shown for better load distribution. Those skilled in the art will appreciate that the disclosed stop arrangement can be reversed so that a stop member is provided on the cross shaft 76 for cooperation with a notch in the sleeve supporting the scarifier teeth 78. This is considered fully equivalent.

Figure 7:
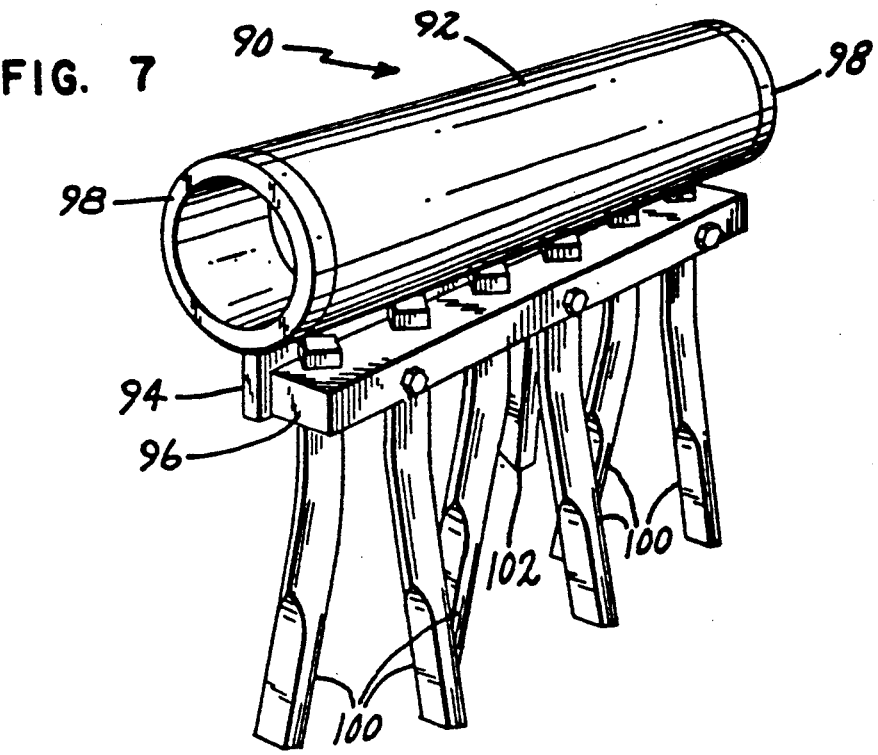
FIG. 7 is an enlarged perspective detailed view showing a tine assembly which can be substituted for the teeth of the scarifier assembly in order to provide relatively less aggressive soil working action.
Figure 8:
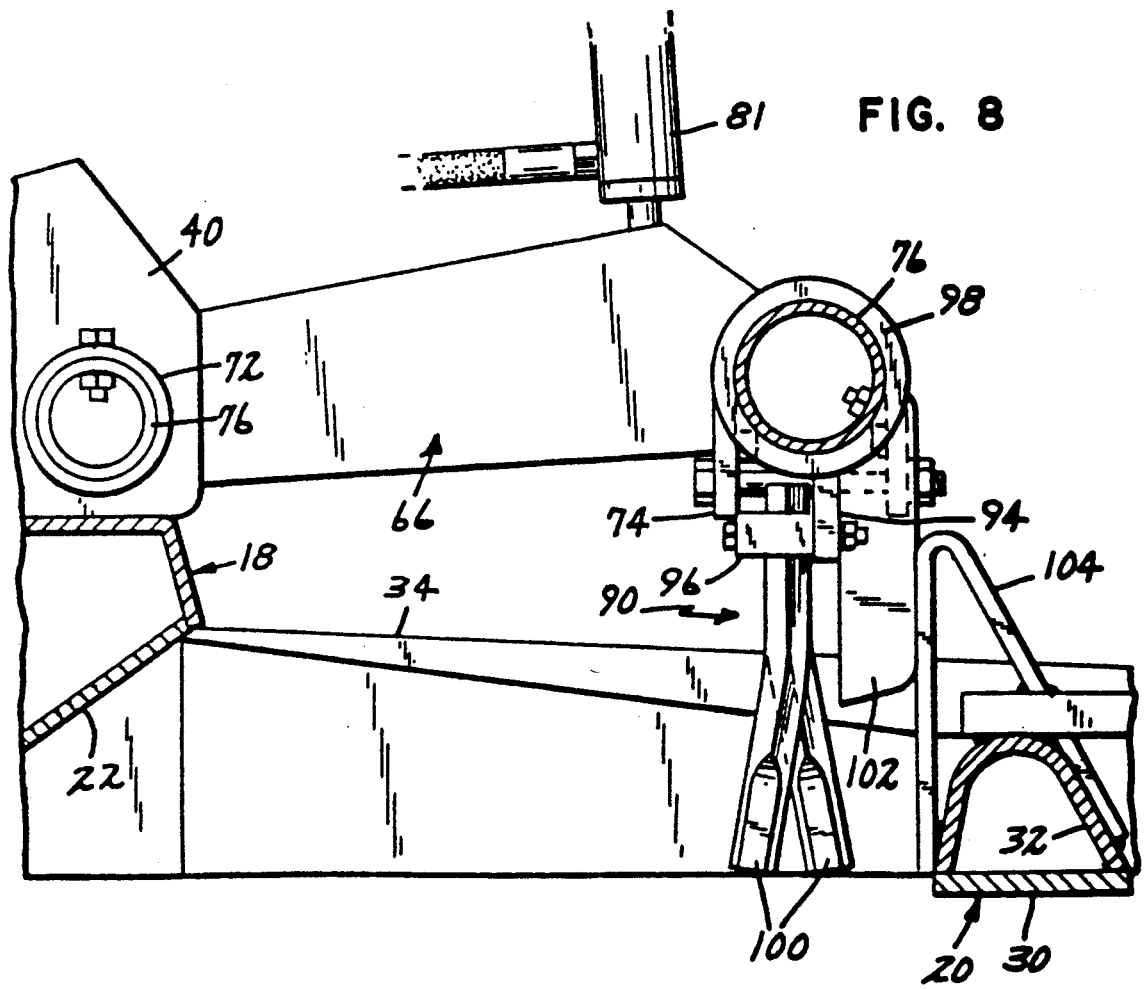
FIG. 8 is a sectional detailed view showing the tine assembly of FIG. 7 mounted on the cross-shaft of the scarifier assembly.

FIGS. 7 and 8 illustrate another modification of the scarifier assembly 16. Some conditions call for working the soil less aggressively than the scarifier teeth 78 would provide. In such situations, tine subassemblies 90 can be substituted for the scarifier subassemblies 77 on the cross shaft 76. Each tine subassembly 90 includes a sleeve 92 with a flange 94 and tool bar 96 secured thereto. Bushings 98 of plastic or other suitable construction are preferably provided in opposite ends of the sleeve 92. A plurality of depending tines 100 are secured to the tool bar 96. As illustrated, the lower ends of the tines 100 diverge outwardly, however, this is not critical to practice of the invention and either straight or curved tines can be utilized as desired. Each tine subassembly 90 further includes a stop 102 thereon for cooperation with another stop 104 mounted on the next adjacent trailing ground engaging member 20. Since the tines 100 are generally less rigid that the scarifier teeth 78, the use of such separate stop structure is preferable. If desired, of course, such separate stop structure could also be adapted for use with the scarifier subassemblies 77. Another cylinder 136 is coupled between the frame brace 46 and the forward cross member 122 of the attachment 110 for controlling its pivotal positioning.

Figure 9:
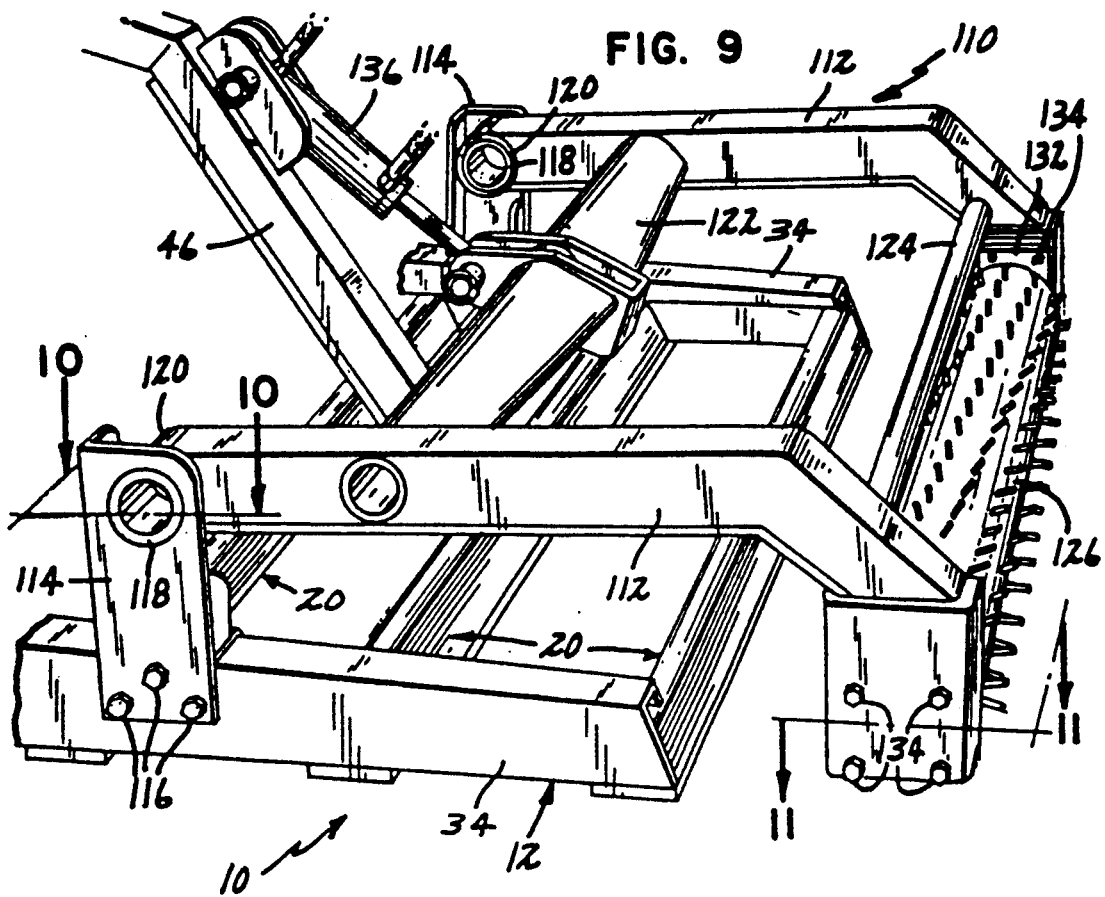
FIG. 9 is a partial perspective view showing the soil leveling apparatus herein with an optional pivotal pulverisor assembly mounted thereon.
Figure 10:
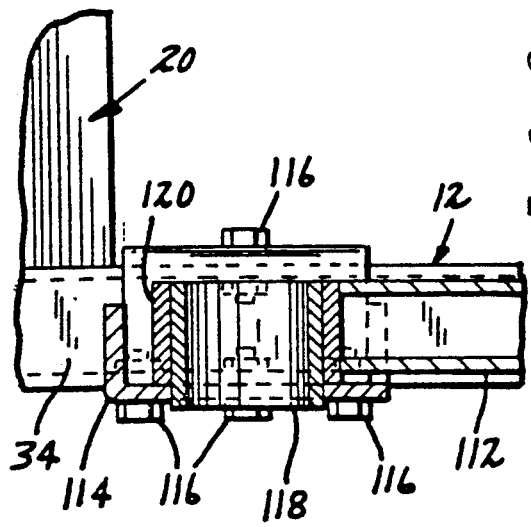
FIGS. 10 and 11 are sectional views taken along lines 10—10 and 11—11, respectively, of FIG 9 in the direction of the arrows.
Figure 11:
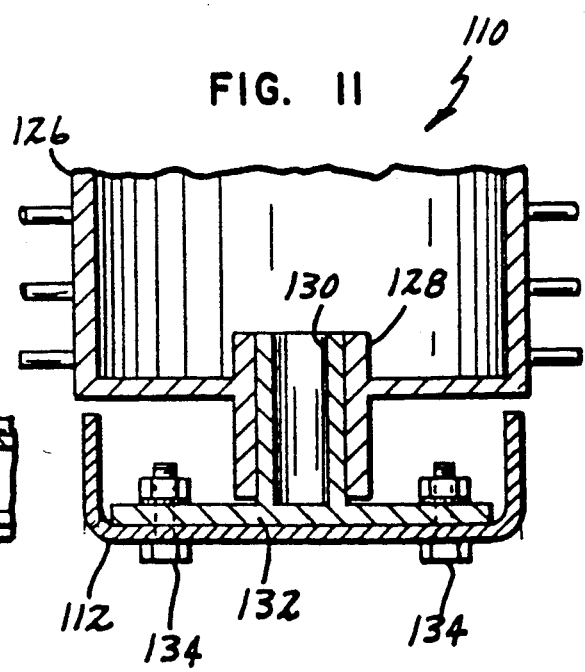
Figure 16:
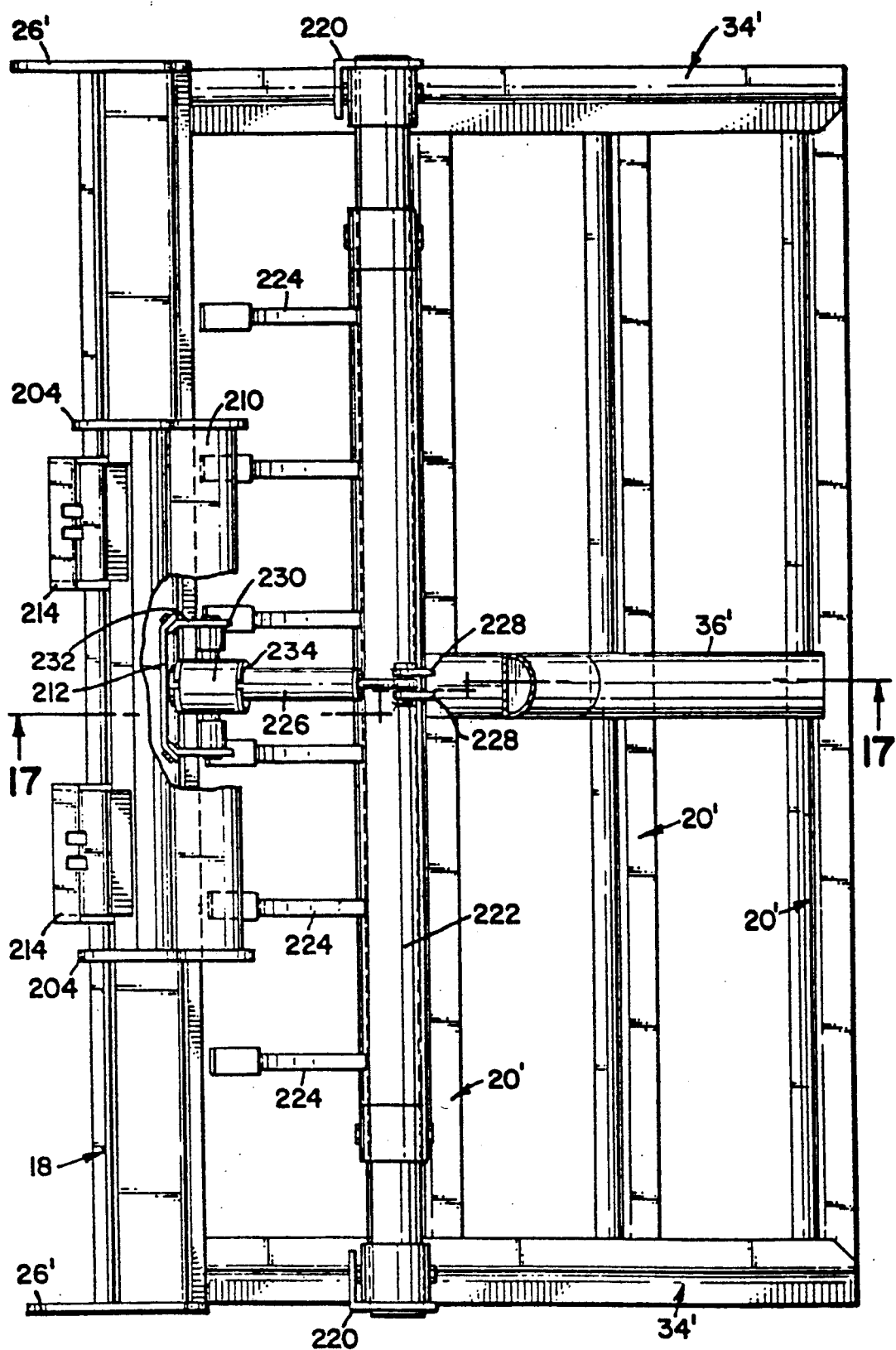
FIG. 16 is a top view of the soil leveling apparatus.

Referring now to FIGS. 9, 10 and 11, there is shown an optional pulverizer attachment 110 which can be mounted on the soil leveling apparatus 10 to provide additional soil working. The attachment 110 includes a pair of arms 112 which are pivoted at their forward ends to brackets 114 secured by bolts 116 to the side members 34 of frame 12. Each bracket 114 includes an inner sleeve 118 on which an outer sleeve 120 of the associated arm is received to define a pivot. A pair of cross members 122, 124 are secured between the arms 112 for rigidity and bracing. A toothed roller 126 is mounted for rotation between the outer or trailing ends of the arms 112. As is best seen in FIG. 11, a bushing 128 is provided in each end of the roller 126 for rotation on an inwardly projecting trunion 130 on a plate 132 secured by bolts 134 to the associated arm 112. This type of mounting enables the roller 126 to span substantially the entire width of the apparatus 10 so that the apparatus can be operated closely adjacent to buildings. sidewalks, etc. although the assembly 110 is illustrated with a toothed roller 126 for pulverizing small dirt clods and the like, it will be appreciated that other devices can be mounted on the attachment. For example, a row of spring fingers or flexible tines can easily be substituted for the toothed roller 126 and carried by the attachment 110.

FIGS. 12 and 14 illustrate a modification of the tine sub-assembly 90 shown in FIGS. 7 and 8. In the subassembly 90, the tines 100 ae secured in fixed relationship to the tool bar 96. Although this construction is sufficiently rugged for most applications, the tines can become damaged and require repalcement. Since the tine subassembly 90 is not particularly well suited to individual replacement of the tines, the tool bar 96 can be replaced with a channel-like member 140 having a plurality of individual tine carriers 142 secured in laterally spaced apart relationship thereto. Each carrier 142 is of generally cylindrical construction, with a flat upper end and a beveled lower end. Replaceable tines 144 and 146 are individually mounted in the carriers 142. The tines 144 are substantially straight, while the tines 146 are angled and positioned in alternate carriers 142. Each of the tines 144 and 146 includes a threaded upper end extending through the respective carrier 142 and being secured in place by means of a washer 148 and nut 150. In addition, each of tines 144 and 146 includes an upset portion or raised lug 152 thereon which engages the beveled lower ends of the carrier 142 so as to effect automatic centering when the nuts 150 are tightened. It will thus be apparent that the tines 144 and 146 can be readily replaced individually.

FIG. 13 shows another tine 154 having a straight portion and offset leg portion 156 that can be used in the position of the endmost tine in the sub-assembly 90 in order to span the gaps between adjacent tine sub-assemblies and thus effect scarifying over substantially the entire width of the scarifier assembly 16. The offset tine 154 also includes a raised lug 152 for centering purposes, and an auxiliary stop 158 is preferably secured to the respective end of the member 140 to reinforce the offset tine against bending and rotation.

Referring now to FIGS. 15-19, there is shown a soil leveling apparatus 200 incorporating a second embodiment of the invention. The soil leveling apparatus 200 of the second embodiment incorporates numerous component parts which are substantially similar to those employed in the apparatus 10 of the first embodiment herein. Such component parts have been identified with the same reference numerals utilized herein before, but have been differentiated therefrom by means of prime (') notations.

The primary difference between the soil leveling apparatus 200 of the second embodiment and the apparatus 10 of the first embodiment is centered in the areas of the hitch and the scarifier assembly. The apparatus 10 of the first embodiment incorporates a connection means 14 which is adapted for use with a three-point hitch, like that typically used on tractors. The soil leveling apparatus 200 of the second embodiment, however, preferably includes a hitch 202 which is particularly adapted for use with adapters of the type found on skid steer loaders, although either type of hitch can be used.

The hitch 202 comprises a pair of laterally spaced apart side plates 204 which are interconnected by cross platers 206 and 208 defining a coverging recess for receiving the upper edge of the pivotal edge adapter plate on the loader. As shown, the cross plate 206 is reinforced by a channel section 210 and an upright post 212. A pair of laterally spaced apart lower mount plates 214 are secured to the front wall of the leading ground engaging member 18' for releasable connection with latches on the lower end of the adapterplate (not shown) on the loader. An adaptor plate of suitable construction is shown in U.S. Pat. No. 3,672,521, the entire disclosure of which is incorporated herein by reference.

As illustrated, the soil leveling apparatus 200 also includes an optional scarifier assembly 216. The apparatus 200 can be used either with or without the scarifier asembly 216. As shown the scarifier assembly 216 includes a fixed cross shaft 218 secured between a pair of brackets 200 fixed to the longitudinal side members 34', which are preferably of inverted generally J-shaped cross section as is best seen in FIG. 21, although side members of any. suitable configuration can be used. A sleeve 222 is supported for rotation about the fixed shaft 218, and a plurality of depending scarifier teeth 224 are secured along the sleeve.

The scarifier assembly 216 is actuated by a cylinder 226 coupled between an offset lug 228 secured to the sleeve 222, and a collar 230 as is best seen in FIG. 17. The piston end of cylinder 226 is coupled to lug 228, while the cylinder end thereof is slideably received in the collar 230. The collar 230 is pivoted on a pair of trunions secured between a pair of lugs 232 on the post 212. In the preferred embodiment, a liner 234 of plastic or other suitable low friction material is provided within the collar 230 to facilitate slideable movement of the cylinder 226. This construction thus provides a lost motion connection which enables the operator to reverse direction with the scarifying teeth 224 pivoting upward and riding on the ground, but without actuating cylinder 226. When cylinder 226 is extended, the cylinder end thereof moves within collar 230 into stopped engagement with post brace 212 so that the scarifier teeth 224 and raised completely or partially out of engagement with the soil. When the cylinder 226 is retracted, the scarifier teeth 224 simply return to their lowered positions, undergravity, as the cylinder end slides away from post 212 in the collar 230, thus providing a lost motion connection which enables the teeth to ride up out of engagement with the soil when the unit is reversed without requiring acutation of the cylinder.

It will be noted that the soil leveling apparatus 200 also incorporates a longitudinal member 36[1] and a longitudinal brace 46[1] of general channel-like construction, but more rounded in order to facilitate forming in a simpler, less expensive manner. In all other respects, the soil leveling apparatus 200 is functionally and structurally similar to the apparatus 10.

FIGS. 19 and 20 illustrate a modification involving usage of an intermediate bracket 236 supporting the cross shaft 218 and providing reinforcement against bending. Usage of an intermediate support bracket 236, however, requires splitting the sleeve 222 into sleeve sections 222-A and 222-B, each of which is provided with a pair of lugs 228-A as is best seen in FIG. 19. In addition, instead of a collar 230, the cylinder 226 has been provided with a clevis 238 which is supported on a pin 240 extending between lugs 232 to provide a lost motion connection.

It will be understood that the positions of collar 230 on clevis 238 could be reversed, if desired. Any such reversal is considered fully equivalent.

The trailing ground engaging member 20$^1$ can be of closed construction including wearplates 30$^1$ secured to and enclosing the open ends of each hollow members 32$^1$. In the alternative, however, ground engaging members 242 of open construction as shown in FIG. 19 can be utilized. Each open ground engaging member 242 comprises a hollow member 32$^1$, which is preferably of generally inverted rounded V-shaped cross section with the forward wall thereof being substantially upright in order to push the soil in a forward direction, and the rear wall being inclined to allow the soil to pass over the ground engaging member in the reverse direction. However, no wearplate 30$^1$ is utilized, and a small blades 244 and 246 can be secured to the walls of the hollow member 232$^1$ to improve cutting action and wear resistance.

From the foregoing, it will thus be apparent that the present invention comprises an improved soil leveling apparatus having several advantages over the prior art. One significant advantage involves use of an adjustable lost motion connection with the connecting means to provide controlled flexibility and some float of the apparatus in order to compensate for various three-point hitches and soil conditions. Another advantage involves the use of a forward ground engaging member which is not suscepitible to clogging under sticky soil conditions in order to perform a scraping function more effectively. The connecting means also serves as the primary support for the scarifier assembly. Other advantages will be evident to those skilled in the art.

Although particular embodiments of the invention have been illustrated in the accompanying drawings and described in the foregoing detailed description, it will be understood that the invention is not limited only to the embodiments disclosed, but is intended to embrace any equivalents, modifications, substitutions and/or rearrangements of elememts falling within the scope of the invention as defined by the following claims.

I claim:

1. An apparatus for leveling soil and the like, comprising:
    a frame including a plurality of transverse elongate ground engaging members fixedly secured together in a mutually spaced apart relationship;
    the ground engaging members of said frame being of inverted generally V-shaped cross section having an apex with downwardly diverging front and rear walls of different inclinations extending downwardly from the apex, and wherein the front wall is more steeply inclined than the rear wall, wherein the front and rear walls extend downwardly from the apex and terminate in lower edges which are substantially coplanar with one another in a substantially horizontal plane and which are in egagement with the ground when the frame is laid flat on the ground; and
    hitch means carried on the frame for connecting the frame to a vehicle.

2. An apparatus as recited in claim 1, wherein the cross section of the ground engaging members is closed at the bottom by a substantially horizontal wear surface extending between the front and rear walls, wherein the wear surface is in engagement with the ground when the frame is placed flat on the ground.

3. An apparatus as recited in claim 2, wherein the ground engaging members have a hollow cross section in which the front and rear walls are formed by downwardly diverging front and rear legs and the wear surface is formed by a transverse wear plate fixedly secured to the front and rear legs.

4. An apparatus as recited in claim 1, wherein the cross section of the gorund engaging members is open at the bottom.

5. An apparatus as recited in claim 4, wherein the ground engaging members are formed by downwardly diverging front and rear legs.

6. An apparatus as recited in claim 5, wherein the lower edges of the walls are formed by transverse wear plates attached to the front and rear legs and extending downwardly therefrom to contact the ground.

7. An apparatus for leveling soil and the like, comprising:
    a frame including a plurality of transverse elongate ground engaging members fixedly secured together in a mutually spaced apart relationship, the ground engaging members of said frame being of inverted generally V-shaped cross section with downwardly diverging front and rear legs of different inclinations, wherein ground engaging members have a closed cross-sectional construction in which the front and rear legs are closed at the bottom by a transverse surface.

8. An apparatus for leveling soil, comprising:
    hitch means which is adapted for connection to a tractor or like motor vehicle;
    frame means which is connected to said hitch means and which engages the ground; and
    means connected to said frame means which is adapted for scarifying ground soil, said scarifying means comprising a plurality of tine members attached to a tool support member on the frame means, said tine members extending transversely relative to the frame means and having lower ends for engaging the ground, the lower ends of the tine members being in a non-parallel relationship such that the lower ends of adjacent tines diverge longitudinally relative to one another, whereby ground soil is less likely to become lodged in between said tine members as the frame means is moved longitudinally; and
    wherein the tool support member is fixed to a sleeve and the sleeve is pivotally mounted on a cross shaft carried on the frame means, and further including means for limiting rearward rotation of the tool support member during forward movement of the frame means to allow the tine to scarify the soil but permitting rotation of the tool support member during reverse movement of the frame.

9. An apparatus as recited in claim 8, wherein the tines are fixedly secured to the tool support member.

10. An apparatus as recited in claim 8, wherein the tines are removably secured to the tool support member to ease replacement of any broken tines.

11. An apparatus as recited in claim 8, wherein the cross shaft is pivotally connected to the frame means to allow the height of the tool support member to be adjusted relative to the frame means.

12. An apparatus for leveling soil, comprising:

hitch means which is adapted for connection to a tractor or like motor vehicle;

frame means which is connected to said hitch means and which engages the ground; and means connected to said frame means which is adapted for scarifying ground soil, said scarifying means comprising a plurality of tine members attached to a tool support member on the frame means, said tine members extending transversely relative to the frame means and having lower ends for engaging the ground, the lower ends of the tine members being in a non-parallel relationship such that the lower ends of adjacent tines diverge longitudinally relative to one another, whereby ground soil is less likely to become lodged in between said tine members as the frame means is moved longitudinally; and wherein the tines are identically shaped having a generally straight upper end attached to the tool support member and a lower end which is longitudinally tilted relative to the upper portion, and wherein adjacent tines are reversed relative to one another on the tool support member to provide the non-parallel relationship of the lower ends of the tines.

13. An apparatus as recited in claim 12, wherein the tines are fixedly secured to the tool support member.

14. An apparatus for leveling soil, comprising:

hitch means which is adapted for connection to a tractor or like motor vehicle;

frame means which is connected to said hitch means and which engages the ground; and means connected to said frame means which is adapted for scarifying ground soil, said scarifying means comprising a plurality of tine members attached to a tool support member on the frame means, said tine members extending transversely relative to the frame means and having lower ends for engaging the ground, the lower ends of the tine members being in a non-parallel relationship such that the lower ends of adjacent tines diverge longitudinally relative to one another, whereby ground soil is less likely to become lodged in between said tine members as the frame means is moved longitudnally; and wherein two differently styled tines are provided comprising a first tine having a generally straight configuration and a second tine having a longitudinally inclined lower end, and wherein the first and second tines are alternated across the tool support member to provide the non-parallel relationship of the lower ends of the tines.

15. An apparatus as recited in claim 14, wherein the tines are removably secured to the tool support member to ease replacement of any broken tines.

16. An apparatus for leveling soil, comprising:

hitch means which is adapted for connection to a tractor or like motor vehicle;

frame means which is connected to said hitch means and which engages the ground; and means connected to said frame means which is adapted for scarifying ground soil, said scarifying means comprising a plurality of tine members, said tine members extending transversely relative to the frame means and having lower ends for engaging the ground, the lower ends of the tine members being in a non-parallel relationship such that the lower ends of adjacent tines diverge longitudinally relative to one another, whereby ground soil is less likely to become lodged in between said tine members as the frame means is moved longitudinally; and further including a plurality of tine subassemblies located side-by-side on the frame means with adjacent subassemblies being separated by small gaps, each subassembly comprising a tool support member having a plurality of tines mounted thereon, and further including an end tine having a straight leg portion supported on the tool support member and an offset leg portion extending outwardly from the stright leg portion to be located at approximately the end of the tool support member, and wherein an end tine is used on at least one end of the tool support member of some of the subassemblies to position an offset leg portion adjacent all of the interior gaps between subassemblies.

17. An apparatus as recited in claim 16, wherein the tine assemblies extend across substantially the entire width of the frame means.

18. An apparatus for leveling soil, comprising hitch means which is adapted for connection to a tractor or like motor vehicle;

frame means which is connected to said hitch means and which engages the ground;

means for scarifying ground soil including at least one tooth element for engaging the soil;

means for rotatably mounting said scarifying means to said frame means for pivotal movement about an axis; and means for pivotally moving said scarifying means about said axis, said moving means comprising a piston cylinder assembly, wherein said piston cylinder assembly is connected to said frame means by a mounting means which permits lost motion between the piston cylinder assembly and said frame means.

19. An apparatus as recited in claim 18, wherein the piston cylinder assembly has a piston end and a cylinder end, wherein the piston end is operatively coupled to the scarifying mounting means for rotating the same, and wherein the piston cylinder assembly mounting means provides sliding motion of the cylinder end of the piston cylinder assembly relative to the frame means to allow reverse movement of the scarifying means without requiring actuation of the piston cylinder assembly.

20. An apparatus as recited in claim 19, wherein said piston cylinder assembly mounting means comprises a clevis which is connected to said piston cylinder assembly, and a pin which is connected to said frame means and is mounted within said clevis so as to permit free sliding motion.

21. An apparatus as recited in claim 19, wherein said piston cylinder assemby mounting means comprises a collar rotatably connected to said frame means, and wherein the cylinder end is slidably located within the collar so as tp permit free sliding motion.

22. An apparatus as recited in cliam 18, wherein said scarifier mounting means comprises:

a cross shaft fixedly connected to said frame means; and a sleeve to which said scarifying means is connected mounted concentrically about said cross shaft for rotation thereon.

23. An apparatus as recited in claim 22, wherein the scarifying means comprises a plurality of tooth elements mounted to and spaced across the sleeve.

24. An apparatus for leveling soil, comprising:
hitch means which is adapted for connection to a tractor or like motor vehicle;
frame means which is connected to said hitch means and which engages the ground, the frame means including a plurality of transverse elongate ground engaging members fixedly secured together in a mutually spaced apart relationship and lying in a common plane;
means for scarifying ground soil including at least one tooth element for engaging the soil;
means for rotatably mounting said scarifying means to said frame means for pivotal movement about an axis, wherein said scarifier mounting means comprises a cross shaft fixedly connected to said frame means and a sleeve to which said scarifying means is connected mounted concentrically about said cross shaft for rotation thereon, wherein the cross shaft is located above the plane in which the ground engaging members lie; and
means connected to the sleeve for pivoting the sleeve about the cross shaft to raise or lower the scarifying means relative to the ground.

25. An apparatus as recited in claim 24, wherein the moving means comprises a piston cylinder assembly connected between the frame means and the sleeve.

26. An apparatus as recited in claim 25, wherein said piston cylinder assembly is connected to said frame means by a mounting means which permits lost motion between the piston cylinder assembly and said frame means.

27. An apparatus for leveling soil, comprising
hitch means which is adapted for connection to a tractor or like motor vehicle;
frame means which is connected to said hitch means and which engages the ground;
means for scarifying ground soil including at least one tooth element for engaging the soil; and
means for rotatably mounting said scarifying means to said frame means for pivotal movement about an axis, wherein said scarifier mounting means conmprises a cross shaft connected to said frame means and a sleeve to which said scarifying means is connected, wherein said sleeve is mounted concentrically about said cross shaft for rotation thereon; and
stop means extending between the sleeve and the cross shaft for limiting rotational movement of the scarifying means.

28. An apparatus as recited in claim 27, wherein the cross shaft is notched over a portion of its periphery to receive therein an inwardly extending stop carrier on the sleeve, the engagement of the stop with at least one end face of the notch in the cross shaft forming the stop means that limits rotational movement of the scarifying means.

29. An apparatus for leveling soil, comprising:
hitch means which is adapted for connection to a tractor or like motor vehicle;
frame means which is connected to said hitch means and includes at least one surface for engaging the ground, the frame means including a transverse, elongate scraper member and at least one trailing transverse ground engaging member fixedly secured together in a mutually spaced apart relationship, the scraper member including a leading lower edge, and each ground engaging member including a lower surface, the leading edge of the scraper member and the lower surfaces of the ground engaging members being substantially coplanar;
means for scarifying ground soil including a plurality of transversely spaced teeth for engaging the soil, wherein the scarifying means is carried on the frame means behind the scraper member and in advance of the ground engaging members;
soil finishing means mounted to the frame means behind the ground engaging members for pivotal movement into and out of ground engagement, wherein said soil finishing means comprises a rotatably roller; and
means independent of the hitch means for selectively raising and lowering the soil finishing roller relative to the frame means into and out of engagement with the ground while the frame means remains in engagement with the ground.

30. An apparatus as recited in claim 29, wherein the raising and lowering means comprises a piston cylinder assembly.

31. An apparatus as recited in claim 29, wherein the roller includes a plurality of teeth thereon for engaging the ground.

32. Apparatus as recited in claim 29, further including:
a pair of longitudinal arms, each arm pivoted at one end to said frame means; and
wherein the roller is mounted between the other ends of said arms.

33. Apparatus as recited in claim 32, wherein the frame means comprises a pair of longitudinal side members between which the ground engaging surfaces are fixedly secured in a mutually spaced apart relationship, and further including a support bracket fixed to and extending upwardly from the longitudinal side members with the support brackets on the side members being longitudinally aligned with one another, and wherein each longitudinal arm has its one end pivotally connected to one of the support brackets at a location above the plane of the longitudinal side members to pivotally journal the arms on the frame means.

34. Apparatus as recited in claim 33 further including a cross-member extending between the arms at a location which is closer to the one end of the arms pivotally secured to the support brackets than to the other end of the arms carrying the roller, and further including a piston cylinder assembly carried on the frame, wherein the piston cylinder assembly includes a piston rod secured to the cross-member for effecting vertical movement of the arms when the piston rod is extended from or drawn into the cylinder.

35. An apparatus for leveling soil and the like, comprising:
a generally rectangular frame including a transverse, elongate scraper member and at least one trailing transverse elongate ground engaging member fixedly secured together in a mutually spaced apart relationship between a pair of longitudinal side members;
the scraper member including a leading lower edge, and each ground engaging member including a lower surface which is wider than the lower edge of the scraper member, the leading edge of the scraper member and the lower surfaces of the ground engaging members being substantially coplanar;
hitch means for mounting the frame to a vehicle;

a pair of longitudinal arms, each arm pivoted at one end to a side member of said frame means; and soil finishing means mounted between the other ends of said arms for pivotal movement into and out of ground engagement in trailing relationship with the apparatus, wherein said soil finishing means comprises a rotatable roller.

36. An apparatus as recited in claim 35, further comprising means connected between said hitch means and said arms for selectively moving the soil finishing means between raised and lowered positions.

37. An apparatus as recited in claim 36, wherein the actuating means comprises a piston cylinder assembly.

38. An apparatus as recited in claim 35, further including means for scarifying ground soil including at least one tooth element for engaging the soil, wherein the scarifying means is carried on the frame means.

39. An apparatus as recited in claim 38, wherein the scarifying means is carried on the frame means behind the scraper member and in advance of the ground engaging members.

40. An apparatus as recited in claim 38, further including means for rotatably mounting said scarifying means to said frame means for pivotal movement about an axis to move the scarifying means into and out of engagement with the gorund.

41. A method of leveling soil, comprising:
trailing over the soil at least one scraper member having a lower edge for scraping the soil;
trailing over the soil behind the scraper member a plurality of spaced downwardly directed teeth which engage the soil for scarifying the soil;
trailing over the soil behind the scraper member and the scarifying teeth at least one elongate ground engaging member having a lower surface which is substantially coplanar with the lower edge of the scraper member, the lower surface being wider than the lower edge and adapted to bear against the soil to flatten the soil;
pulverizing the flattened soil by means of a rotatable roller which is trailed behind the ground engaging member; and
selective raising the roller out of engagement with the ground when the soil pulverizing function is not desired while leaving the scraper and the ground engaging members in engagement with the soil for continued soil flattening.

42. An apparatus as recited in claim 41, wherein the roller is toothed.

43. An apparatus for leveling soil and the like, comprising:
a frame including a plurality of transverse elongate ground engaging members fixedly secured together in a mutually spaced apart relationship;
the ground engaging members of said frame being of inverted generally V-shaped cross section with downwardly diverging front and rear walls of different inclinations, wherein the front and rear walls have lower edges which are substantially coplanar with one another in a substantially horizontal plane when the frame is laid on the ground, wherein the cross section of the ground engaging members is closed at the bottom by a substantially horizontal wear surface extending between the front and rear walls, and wherein the wear surface is in engagement with the ground when the frame is placed flat on the ground; and
hitch means carried on the frame for connecting the frame to a vehicle.

44. An apparatus as recited in claim 43, wherein the ground engaging members have a hollow cross section in which the front and rear walls are formed by downwardly diverging front and rear legs and the wear surface is formed by a transverse wear plate fixedly secured to the front and rear legs.

45. An apparatus as recited in claim 43, wherein the front wall is substantially upright to push the soil when the frame is moved in a forward direction, and wherein the rear wall is more inclined than the front wall to allow the soil to pass over the ground engaging member when the frame is moved in a reverse direction.

46. An apparatus for leveling soil and the like, comprising:
a frame including a plurality of transverse elongate ground engaging members fixedly secured together in a mutually spaced apart relationship;
the ground engaging members of said frame being of inverted generally V-shaped cross section with downwardly diverging front and rear walls of different inclinations, wherein the front and rear walls have lower edges which are substantially coplanar with one another in a substantially horizontal plane when the frame is laid flat on the ground, wherein the cross section of the ground engaging members is open at the bottom with the front and rear walls extending downwardly sufficiently far so that the lower edges of the walls are both in engagement with the ground when the frame is placed flat on the ground;
wherein the ground engaging members are formed by downwardly diverging front and rear legs, and wherein the lower edges of the walls are formed by transverse wear plates attached to the front and rear legs and extending downwardly therefrom to contact the ground; and
hitch means carried on the frame for connecting the frame to a vehicle.

47. An apparatus as recited in claim 46, wherein the front wall is substantially upright to push the soil when the frame is moved in a forward direction, and wherein the rear wall is more inclined than the front wall to allow the soil to pass over the ground engaging member when the frame is moved in a reverse direction.

48. An apparatus for working soil, comprising: hitch means which is adapted for connection to a tractor or like motor vehicle;
frame means which is connected to said hitch means;
means for scarifying ground soil including at least one tooth element for engaging the soil;
means for rotatably mounting said scarifying means to said frame means for pivotal movement about an axis; and
means for pivotally moving said scarifying means about said axis, said moving means comprising a piston cylinder assembly, wherein said piston cylinder assembly is connected to said frame means by a mounting means which permits lost motion between the piston cylinder assembly and said frame means, whereby said at least one tooth may pivot during reverse movement of said frame means.

49. An apparatus as recited in claim 48, wherein the piston cylinder assembly has a piston end and a cylinder end, wherein the piston end is operatively coupled to the scarifying mounting means for rotating the same, and wherein the piston cylinder assembly mounting means provides sliding motion of the cylinder end of the piston cylinder assembly relative to the frame means to allow reverse movement of the scarifying means without requiring actuation of the piston cylinder assembly.

50. An apparatus as recited in claim 49, wherein said piston cylinder assembly mounting means comprises a clevis which is connected to said piston cylinder assembly, and a pin which is connected to said frame means and is mounted within said clevis so as to permit free sliding motion.

51. An apparatus as recited in claim 49, wherein said piston cylinder assembly mounting means comprises a collar rotatably connected to said frame means, and wherein the cylinder end is slidably located within the collar so as to permit free sliding motion.

52. An apparatus as recited in claim 48, wherein said scarifier mounting means comprises:
  a cross shaft fixedly connected to said frame means; and
  a sleeve to which said scarifying means is connected mounted concentrically about said cross shaft for rotation thereon.

53. An apparatus as recited in claim 52, wherein the scarifying means comprises a plurality of tooth elements mounted to and spaced across the sleeve.

54. An apparatus for working soil, comprising:
  hitch means which is adapted for connection to a tractor or like motor vehicle;
  frame means which is connected to said hitch means;
  means for scarifying ground soil including at least one tooth element for engaging the soil; and
  means for rotatably mounting said scarifying means to said frame means for pivotal movement about an axis, wherein said scarifier mounting means comprises a cross shaft connected to said frame means and a sleeve to which said scarifying means is connected, wherein said sleeve is mounted concentrically about said cross shaft rotation thereon; and
  stop means extending between the sleeve and the cross shaft for limiting rotational movement of the scarifying means.

55. An apparatus as recited in claim 54, wherein the cross shaft is notched over a portion of its periphery to receive therein an inwardly extending stop carried on the sleeve, the engagement of the stop with at least one end face of the notch in the cross shaft forming the stop means that limits rotational movement of the scarifying means.

* * * * *